United States Patent
Clews-de Castella et al.

(10) Patent No.: US 12,046,036 B2
(45) Date of Patent: Jul. 23, 2024

(54) SYSTEMS AND METHODS FOR CUSTOMIZED PRESENTATION OF DIGITAL INFORMATION IN A PHYSICAL SPACE

(71) Applicant: PHORIA PTY LTD., Fitzroy (AU)

(72) Inventors: Trent Clews-de Castella, Fitzroy (AU); Fabian Ulpiano, Fitzroy (AU)

(73) Assignee: PHORIA PTY LTD., Fitzroy (AU)

( * ) Notice: Subject to any disclaimer, the term of this patent is extended or adjusted under 35 U.S.C. 154(b) by 0 days.

(21) Appl. No.: 17/286,817

(22) PCT Filed: Oct. 21, 2019

(86) PCT No.: PCT/IB2019/001153
§ 371 (c)(1),
(2) Date: Apr. 19, 2021

(87) PCT Pub. No.: WO2020/079487
PCT Pub. Date: Apr. 23, 2020

(65) Prior Publication Data
US 2021/0374409 A1    Dec. 2, 2021

Related U.S. Application Data

(60) Provisional application No. 62/748,128, filed on Oct. 19, 2018.

(51) Int. Cl.
*G06T 7/73*   (2017.01)
*G06T 19/00*  (2011.01)
*G06V 20/30*  (2022.01)

(52) U.S. Cl.
CPC ........ *G06V 20/30* (2022.01); *G06T 7/75* (2017.01); *G06T 19/003* (2013.01); *G06T 19/006* (2013.01); *G06T 2219/024* (2013.01)

(58) Field of Classification Search
CPC .... G06T 7/70; G06T 7/73; G06T 7/75; G06T 19/006; G06T 2219/024; G06V 20/30; G06K 9/0067
See application file for complete search history.

(56) References Cited

U.S. PATENT DOCUMENTS 9,058,764 B1  6/2015  Persson et al.
9,972,137 B2  5/2018  Petrovskaya et al.
(Continued)

OTHER PUBLICATIONS

International Search Report and Written Opinion for International Application No. PCT/IB2019/001153, mailed Mar. 23, 2020 (9 pages).

*Primary Examiner* — Diane M Wills
(74) *Attorney, Agent, or Firm* — Finnegan, Henderson Farabow, Garrett & Dunner, LLP

(57) ABSTRACT

Methods, devices, and computer-readable storage media for the customized presentation of digital information in a physical space, the method formulates information from physical space and accesses a predetermined first group of data sets of a virtual space based on the formulated information. The accessed virtual space is associated with the physical space. The method then generates a local data set associated with the first group of data sets and accesses a predetermined second group of data sets of the same virtual space. The method then transforms the second group of data sets using the local data set and provides the transformed data sets to be overlaid on the physical space.

20 Claims, 14 Drawing Sheets

(56) References Cited

U.S. PATENT DOCUMENTS

| | | | |
|---|---|---|---|
| 10,026,229 B1* | 7/2018 | Yalniz | G06T 7/74 |
| 2013/0155058 A1 | 6/2013 | Golparvar-Fard et al. | |
| 2014/0247279 A1* | 9/2014 | Nicholas | G06F 3/011 |
| | | | 345/633 |
| 2016/0292927 A1* | 10/2016 | Finn | H04W 88/02 |
| 2016/0358383 A1* | 12/2016 | Gauglitz | G06F 3/0304 |
| 2018/0165883 A1* | 6/2018 | Osotio | G06T 19/006 |
| 2018/0321692 A1* | 11/2018 | Castillo-Effen | G05D 1/0094 |
| 2020/0098179 A1* | 3/2020 | Gough | G09G 5/377 |
| 2020/0342672 A1* | 10/2020 | Schmelig | G06F 3/011 |
| 2021/0166491 A1* | 6/2021 | Green | G06F 3/04842 |

* cited by examiner

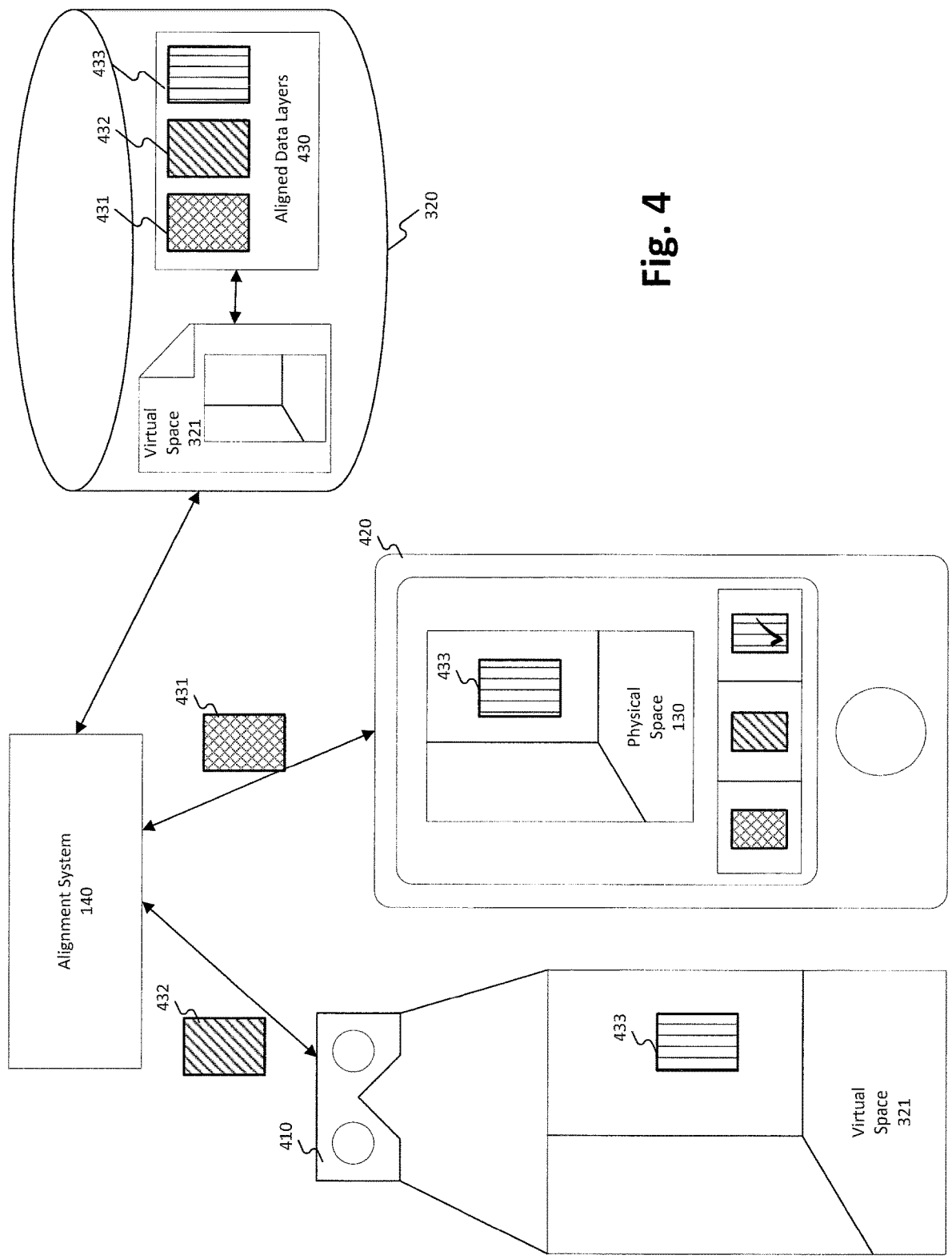

SYSTEMS AND METHODS FOR CUSTOMIZED PRESENTATION OF DIGITAL INFORMATION IN A PHYSICAL SPACE

CROSS-REFERENCE TO RELATED APPLICATIONS

This application claims priority of U.S. application 62/748,128, which was filed on Oct. 19, 2018, and which is incorporated herein in its entirety by reference.

TECHNICAL FIELD

This disclosure relates to identifying an object in an image. More specifically, this disclosure relates to systems and methods for customized presentation of digital information in a physical space.

BACKGROUND

Alignment of digital information is a requirement of using mixed reality environments. Alignment markers in the form of QR codes or physical objects have been used to guide the plan to align digital information. Conventional alignment techniques use templates limiting types of surfaces and devices to align information.

Accordingly, there is a need for a new cross-platform method to improve the usage of mixed reality environments irrespective of the hardware and software technology.

SUMMARY

Certain embodiments of the present disclosure relate to a non-transitory computer readable medium including instructions that when executed by at least one processor cause the at least one processor to perform operations for customized presentation of digital information in a physical space. The operations may include formulating information about one or more portions of a physical space; accessing, based on the formulated information, a predetermined first group of data sets of a virtual space associated with the physical space; generating a local data set associated with the first group of data sets of the virtual space; accessing a predetermined second group of data sets of the virtual space associated with the physical space; transforming the second group of data sets based on the generated local data set; and providing the transformed second group of data sets overlaid on the physical space.

Certain embodiments of the present disclosure relate to a computer-implemented method for customized presentation of digital information in a physical space. The method includes formulating information about one or more portions of a physical space; accessing, based on the formulated information, a predetermined first group of data sets of a virtual space associated with the physical space; generating a local data set associated with the first group of data sets of the virtual space; accessing a predetermined second group of data sets of the virtual space associated with the physical space; transforming the second group of data sets based on the generated local data set; and providing the transformed second group of data sets overlaid on the physical space.

Certain embodiments of the present disclosure relate to a non-transitory computer readable medium including instructions that when executed by at least one processor cause the at least one processor to perform operations for customized presentation of information in a physical space. The operations may include receiving scanned information of the physical object from one or more sources; determining a first set of one or more alignment points in the scanned information of the physical space using a computer vision process; receiving a second set of one or more alignment points of one or more portions of the physical space form a first user accessing the multi-usage environment; categorizing the first set of one or more alignment points based on the received second set of one or more alignment points; and adding and removing one or more of the first set of one or more alignment points based on the second set of one or more alignment points.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

FIG. 4 illustrates multiple devices accessing previously aligned data to present in a device display environment, according to some embodiments of the present disclosure.

DETAILED DESCRIPTION

Exemplary embodiments are described with reference to the accompanying drawings. Wherever convenient, the same reference numbers are used throughout the drawings to refer to the same or like parts.

Figure 1:
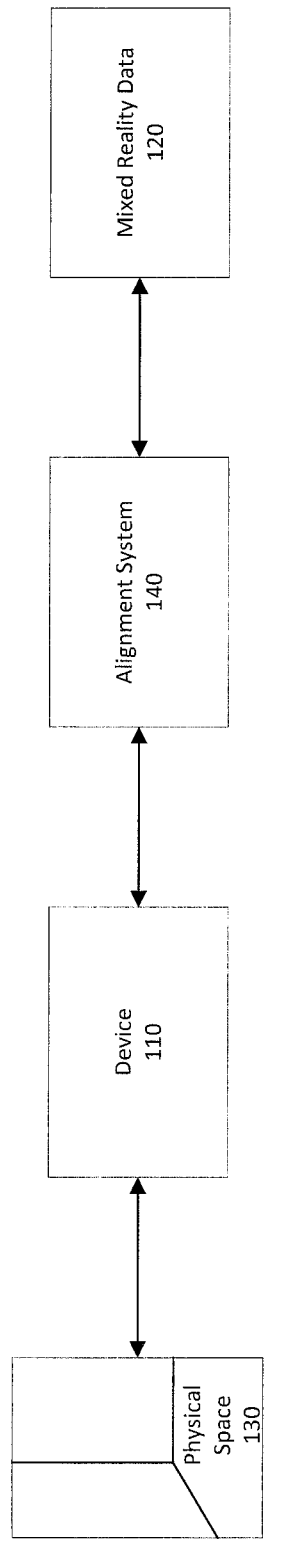
FIG. 1 is a block diagram of a device interaction with mixed reality data, according to some embodiments of the present disclosure.

FIG. 1 is a block diagram of a device interaction with mixed reality data, according to some embodiments of the present disclosure. As shown in FIG. 1, a device 110 interacts with mixed reality data 120 by connecting with a physical space 130 and an alignment system 140 with access to the virtual space details of the physical space. The device 110 may be present in the physical space 130, or the device 110 may have selected the digital equivalent of a physical space 130 from a list of locations available for interaction through the device 110. The physical space 130 can be an outdoor point of interest or a room inside a building. The device 110 interaction with the mixed reality data 120 may involve access to additional digital information related to the surrounding of physical space 130 and presenting the digital information adjacent to the relevant surrounding of the physical space 130. The placement of the mixed reality data 120 adjacent to the relevant surroundings of physical space 130 may involve the alignment of prior captured virtual data of the surroundings of the physical space 130. The alignment system 140 includes software tools and libraries to both continuously manage the mixed reality data 120 captured by the device 110 and interaction of the mixed reality data 120 through varied sets of hardware and operating systems/software used by the device 110.

Figure 2:
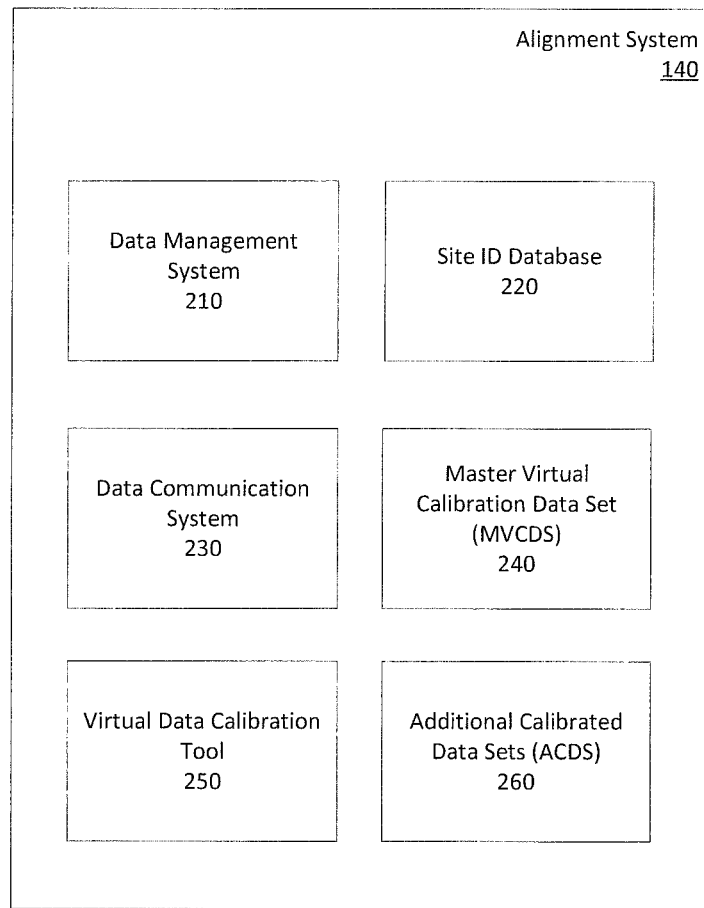
FIG. 2 is a block diagram of an alignment system, according to some embodiments of the present disclosure.

FIG. 2 is a block diagram of the alignment system 140, according to some embodiments of the present disclosure. As shown in FIG. 2, the alignment system 140 includes multiple software libraries and tools. The alignment system 140 interacts with the mixed reality data 120 stored locally or in a database using a data management system 210. The data management system 210 helps store and query the mixed reality data 120. The data management system 210 may act as an object relation mapper layer to the mixed reality data 120 stored in a database. In response to a request to store virtual data of a new physical space, the data management system 210 creates a site ID unique to the physical space which it stores in a site ID database 220. The unique site ID is prepared by the data management system 210 from identification markers associated with a physical space. For example, the physical space 130 identification markers may include GPS coordinates, a street address, and/or a local identifier (name and/or number) of a building. Physical space markers may also include floor and room details, and may also include a portion of the room, e.g., office cubicle details.

A data communication system 230 may interact with device 110 and parse the mixed reality data 120 to transform it to aligned layers of data scaled and repositioned to suit the device 110 prior to sharing the data with the device 110. The data communication system 230 accesses the mixed reality data 120 through the data management system 210 by providing the unique site ID associated with the physical space 130. The site ID may be determined by the data management system 210 based on the data about the surroundings of physical space 130 supplied by the data communication system 230. The surroundings of physical space 130 may be captured by sensors associated with device 110. Further details of capturing surroundings of the physical space 130 are described below with reference to FIG. 3.

Alignment system 140 also helps align the mixed reality data 120 to the physical space 130 in order to present the mixed reality data 120 adjacent to the relevant surroundings of the physical space 130. Alignment system 140 maintains a master virtual calibration data set 240 generated using a virtual data calibration tool 250 in order to help align the mixed reality data 120 to the surroundings of physical space 130. The virtual data calibration tool 250 reviews virtual details of the physical space 130 present in the mixed reality data 120 to identify alignment points. The alignment points help align the virtual details of the physical space 130 as well as additional calibrated data sets 260 associated with the physical space 130. The alignment points may include immovable and/or unique points of interest in the physical space, which can uniquely identify the physical space 130. The virtual data calibration tool 250 is used to identify the position, orientation, and scale of the virtual data associated with the physical space 130. The alignment points identified by the virtual data calibration tool 250 are also part of the master virtual calibration data set (MVCDS) 240. MVCDS 240 may be updated at regular intervals based on the information captured and provided by the device 110 of the physical space 130 surroundings.

The alignment system 140 may also include the additional calibrated data sets (ACDS) 260, which includes data sets from other sources describing the physical space 130 and its surroundings. The ACDS 260 may include virtual data about the physical space 130 not automatically captured using the device 110 or prior scanning of the physical space 130. For example, the ACDS 260 may include building information model (BIM) data used while constructing the physical space 130 or blueprint data prepared prior to the construction of the physical space 130. The alignment points identified and stored in the MVCDS 240 are used to align the additional data layers (such as BIM and blueprint data) to the virtual data of the physical space 130. The device 110 may access the ACDS 260 data layers through user selection of these layers.

Figure 3:
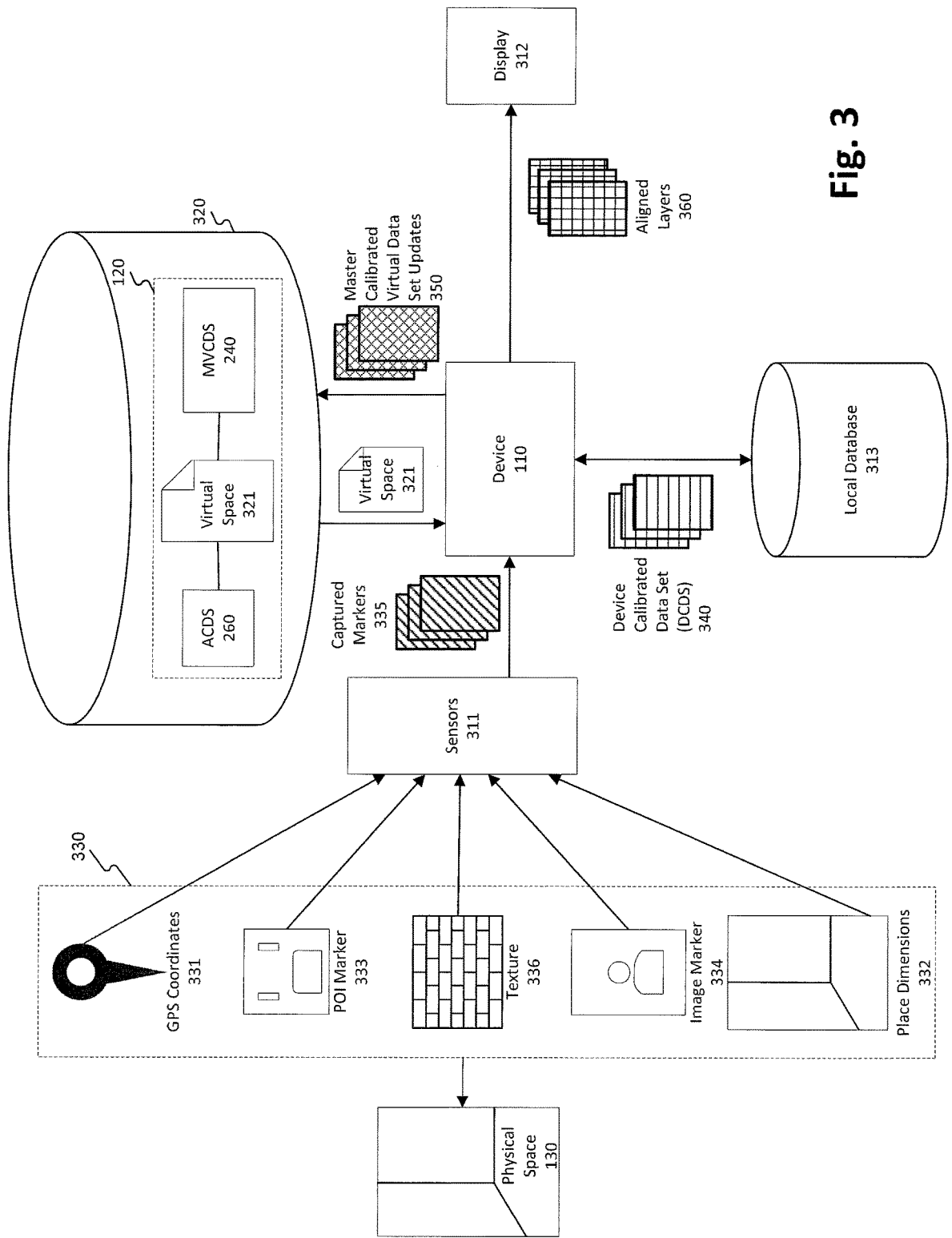
FIG. 3 illustrates an exemplary device interaction with physical space and mixed reality data, according to some embodiments of the present disclosure.

FIG. 3 illustrates an exemplary device interaction with the physical space and mixed reality data, according to some embodiments of the present disclosure. As shown in FIG. 3, the device 110 interacts with sensors 311 to access information of the physical space 130 and the present mixed reality data 120 adjacent to the surroundings of physical space 130 using a display 312. The device 110 may also include, or have access to, a local database 313 to store device specific details for operating both sensors 311 and the display 312. The device 110 may direct one or more sensors of sensors 311 to capture various identification makers 330 of the physical space 130.

Sensors 311 may extract some of the identification markers 330 based on relevancy and reliability. The device 110 may use captured markers 335 as alignment points to align the device 110 to the physical space 130. Alignment of the device 110 to the physical space 130 includes vertical and horizontal alignment of mixed reality data of the physical space 130. Some of the identification markers 330 may be used to identify the location of the device 110, and some other markers may be used to identify the position and orientation of the device 110 within an identified location. For example, GPS coordinates 331 and place dimensions 332 may be used to identify a building and a room within a building and Point of Interest (POI) markers 333 and an image marker 334 may be used to determine the orientation and position of the device within the identified room. A texture marker 336 may also be helpful in understanding the orientation of the device. For example, a texture of a wall versus the texture of a floor captured by a camera sensor and shared with the device 110 can help determine the position and orientation of the device 110 based on the amount of floor and wall present in the captured image of the physical space 130. In some embodiments, the identification markers 330 may be captured and/or organized in a hierarchical fashion. The macro-level location-related markers GPS coordinates 331 and place dimensions 332 may he captured first, and then the more specific micro-level position and orientation related markers (e.g., POI marker 333, image marker 334, and texture 336) may be captured by sensors 311 on request from the device 110. Some of the identification markers may be captured and/or shared with the alignment system 140 only if required for the identification of the surroundings of the physical space 130.

The captured markers 335 may be used by the device 110 to identify the physical space 130 by querying the database 320 containing the mixed reality data 120 associated with the physical space 130. The mixed reality data 120 may be stored in whole or in part in the database 320. The mixed reality data 120 associated with the physical space 130 includes a three-dimensional scan of the physical space 130 stored as virtual space 321, additional data ACDS 260 from third-party sources further describing the physical space 130 not captured by sensors 311, and data related to alignment of ACDS 260 and virtual space 321 as master virtual calibrated data set 240 which aids a device to align to the alignment points in the physical space 130.

The device 110 may convert the captured markers 335 to a site ID in the site ID database 220. In some embodiments, the device 110 may send the captured markers 335 to the alignment system 140 requesting the data management system 210 to determine the site ID of the physical space 130 based on the captured markers 335. The captured markers may be shared with the data management system 210 using the data communication system 230. Upon determination of the site ID, the database 320 is queried to identify a virtual space 321 of the mixed reality data 120. The virtual space 321 represents the three-dimensions scan of the physical space. The virtual space 321 may have been prepared by stitching the prior 3D scan of the physical space. The query results may also include a subset of the MVCDS 240 relevant to the physical space. The captured markers 335 may be compared to the MVCDS 240 to identify the relevant ones which have been previously used for calibrating the virtual space 321.

In some embodiments, the MVCDS 240 may be pre-supplied to the device 110 when sensors 311 determine the location in the physical space 130, where the device 110 is currently located. The supplied MVCDS 240 may then be used to determine what are the appropriate identification markers 330 to capture from the physical space 130. The device 110 may also share device details along with the location details identified by the sensors 311 to the alignment system 140 to identify a subset of MVCDS 240. The identified subset of MVCDS 240 shared with the device 110 may depend on the capabilities of the device 110, including the availability of types of sensors 311. The MVCDS 240 defines the possible alignment methods based on the types of alignment markers. The captured markers 335 may be used to align the markers to the virtual space 321 according to the defined methods in MVCDS 240. For example, the methods can include point of interest marker alignment and/or image marker alignment, and the device 110 may then capture an image marker 334 and a POI marker 333. Upon the alignment of the captured markers 335 to the virtual space 321, the device 110 may save the relevant position and orientation data related to the marker as a device calibration data set 340 (DCDS) in the local database 313.

Upon alignment of the device 110 to the physical space 130, the device 110 may share some of the calibration data with the database 320 as updates to the MVCDS 240. Master calibrated virtual data updates 350 may include additional alignment points introduced since the previous virtual space 321 representation of the physical space 130. The MVCDS updates 350 may also include points of alignment shared with each device, including points that were determined to be incorrect on usage by those devices. The MVCDS updates 350 also include missing alignment markers due to new obstructions. All these updates are added to the MVCDS 240.

The device 110, upon being calibrated to display aligned information may request one or more additional calibrated data sets 260 to be displayed on the display 312. The ACDS 260 may be transformed using the DCDS 340 prior to sharing them on the display screen. The transformed aligned layers 360 are presented on the display screen by overlaying on the surfaces of the physical space both vertically and horizontally aligned with the surfaces. In some embodiments, the virtual space 321 may be presented on the display 312 as one of the aligned layers 360.

FIG. 4 illustrates multiple devices access to the previously aligned data to present on a device display environment, according to some embodiments of the present disclosure. As shown in FIG. 4, devices 410 and 420 access the same physical space 130 related information for viewing on their respective displays. The device 410 is a virtual reality headgear accessing the information in the virtual space 321 associated with the physical space 130. The device 420 is a mobile device present in the physical space 130 accessing information to be presented adjacent to the surroundings of the physical space 130.

The device 410 accesses the virtual space 321 by sharing the site ID with the alignment system 140 to query the database 320. The virtual space 321 may be the only layer of data accessible to device 410. Unlike the headgear device 410, mobile device 420 may select aligned data layer 433 from aligned data layers 430 by default to present in the virtual space 321. Device 420 may be similar to device 110 described in FIG. 3 and may share captured markers 355 to identify the physical space 130 before making the request for aligned data layers. The aligned data layers 430 may be a subset of the ACDS 260. The aligned data layer 433 may be selected by a user or may be presented by default when interacting with the mixed reality data 120 associated with the physical space 130. One of the aligned data layers 430 may be the virtual space 321 as accessed by the headgear device 410. The mobile device 420 may switch between viewing the aligned data layers 430 augmented to the physical space 130 (by overlaying aligned data layers 430 on the physical space 130) and viewing the virtual space 321 overlaid on the physical space 130. The act of switching between virtual space and physical space with augmented aligned data layers is described in detail below with reference to FIGS. 8A-8B.

In some embodiments, the alignment system 140 may act as an intermediary for sharing information between devices 410 and 420. Devices 410 and 420 may be able to share location information in the form of a dynamic aligned data layer available during the current session in which both devices are accessing the same mixed reality data 120 containing the virtual space 321 and the aligned data layers 430. For example, the device 420 may share the location of the device in the physical space 130 with the device 410 by requesting the alignment system 140 to prepare a dynamic location layer. The dynamic location layer may be aligned with the virtual space 321 prior to sharing it with the device 410, which may present the information in a manner only visible upon the device 410, virtually reaching the location. A location pin may be obstructed from view by the walls in the physical space 130 and, for that reason, only visible on reaching the location virtually in virtual space 321. In addition to sharing the location, the devices 420 may aid in generating a wayfinding path to the location for the device 410 to navigate and reach the same location in the virtual space 321. The wayfinding path can also he a dynamic aligned data layer temporarily generated for sharing with other devices. The alignment system 140 may capture the wayfinding path based on movements of the devices 110, 410, and 420 in the physical space 130. The alignment system 140 may prepare wayfinding layers based on access and usage of the aligned data layers 430 and the virtual space 321 by the devices 410 and 420. A wayfinding dynamic alignment layer may be generated and updated continuously as a spatial map of walkable positions in a physical space (e.g., the physical space 130) using a fusion of various data layers of the physical space 130 managed by the data management system 210. The fusion may include obtaining a 3D collision mesh from the 3D scan of the physical space present in the virtual space 321. The collision mesh utilized along with real-time depth information (for example, from the camera and other depth sensors associated with devices 110, 410, and/or 420) can help determine potential clashes with obstructions in the physical space (e.g, physical space 130) and make sure the path does not drift too far away from the middle of an aligned layer. The fused layers may also utilize other alignment markers like doors and doorknobs to understand how to navigate between rooms within the physical space 130.

Figure 5B:
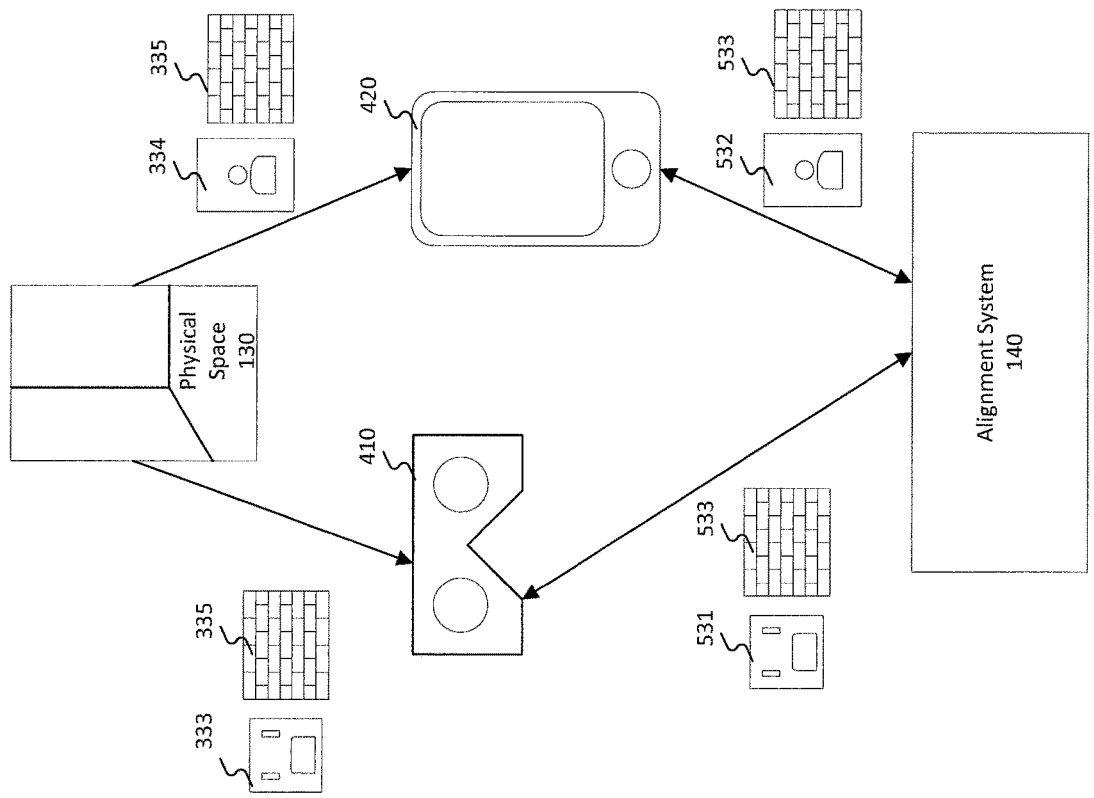
FIGS. 5A-5B illustrate preparation of a physical space for alignment and access to alignment data in the physical space, according to some embodiments of the present disclosure.
Figure 5A:
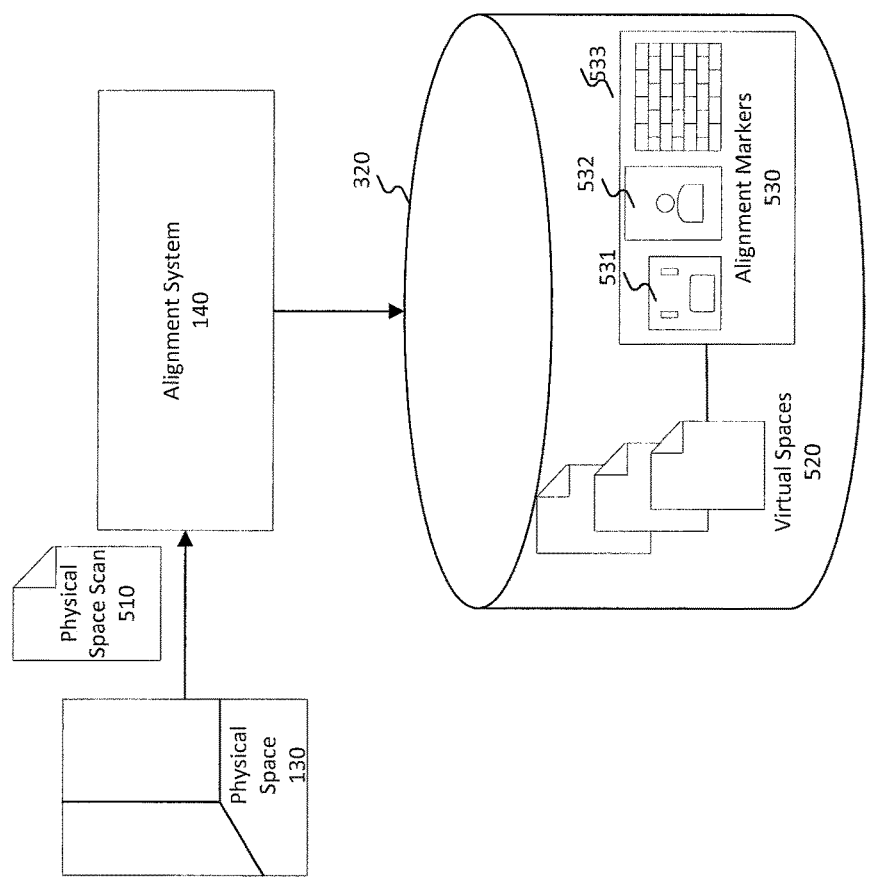

FIGS. 5A-5B illustrate preparation of a physical space for alignment and access to alignment data in the physical space, according to some embodiments of the present disclosure. Alignment setup involves an initial setup of the physical space 130 using a physical space scan 510, as shown in FIG. 5A, followed by the devices, e.g., devices 410, 420, continuously accessing the aligned data to analyze the alignment points using sensors associated with the device 410 or 420, as shown in FIG. 5B.

As shown in FIG. 5A, the alignment system 140 receives an initial three-dimensional physical space scan 510 of the physical space 130. The physical space scan 510 is stored by the alignment system 140 in database 320 along with other virtual spaces 520. The storage of the physical space scan 510 in the database 320 may be handled by the data management system 210. As described earlier (in FIG. 3), the data management system 210 prepares a site ID and determines the alignment points within the physical space scan 510. The alignment points are saved to a set of alignment markers 530 and associated with the virtual spaces 520, which include the physical space scan 510. The alignment markers 530 include a varied set of alignment points needed by various types of devices to align the device to the physical space 130 in order to present the mixed reality data 120 on the physical space 130. The alignment markers 530 may include point of interest markers 531, images markers 532, and texture markers 533 to identify the position, orientation, and other spatial information of the device (e.g., device 410 or 420) within the physical space 130.

As shown in FIG. 5B, the devices 410 and 420 interact with the physical space 130 to receive identification markers, both for identifying the physical space 130 and to also help align the mixed reality data 120 on the physical space 130. The device 410, on receiving identification markers 333 and 335, requests the alignment system 140 for similar alignment markers 531 and 533 stored in the database 320. The differences in the orientation and position of the identification and alignment markers help determine the device calibration data set 340 to be utilized in transforming the alignment layers in the ACDS 260 before overlaying them on the physical space 130. In some embodiments, the alignment markers may not include all the identification markers determined by a device in the physical space 130. Additional markers determined by the devices 410 and 420 may be included in the MVCDS 240 for future interactions of the physical space 130 for viewing the ACDS 260 data. Additionally, existing alignment details in the form of position and orientation and other spatial data may also be updated based on the new spatial information provided by the devices 410 and 420 to alignment the system 140 for the alignment markers 530.

Figure 6:
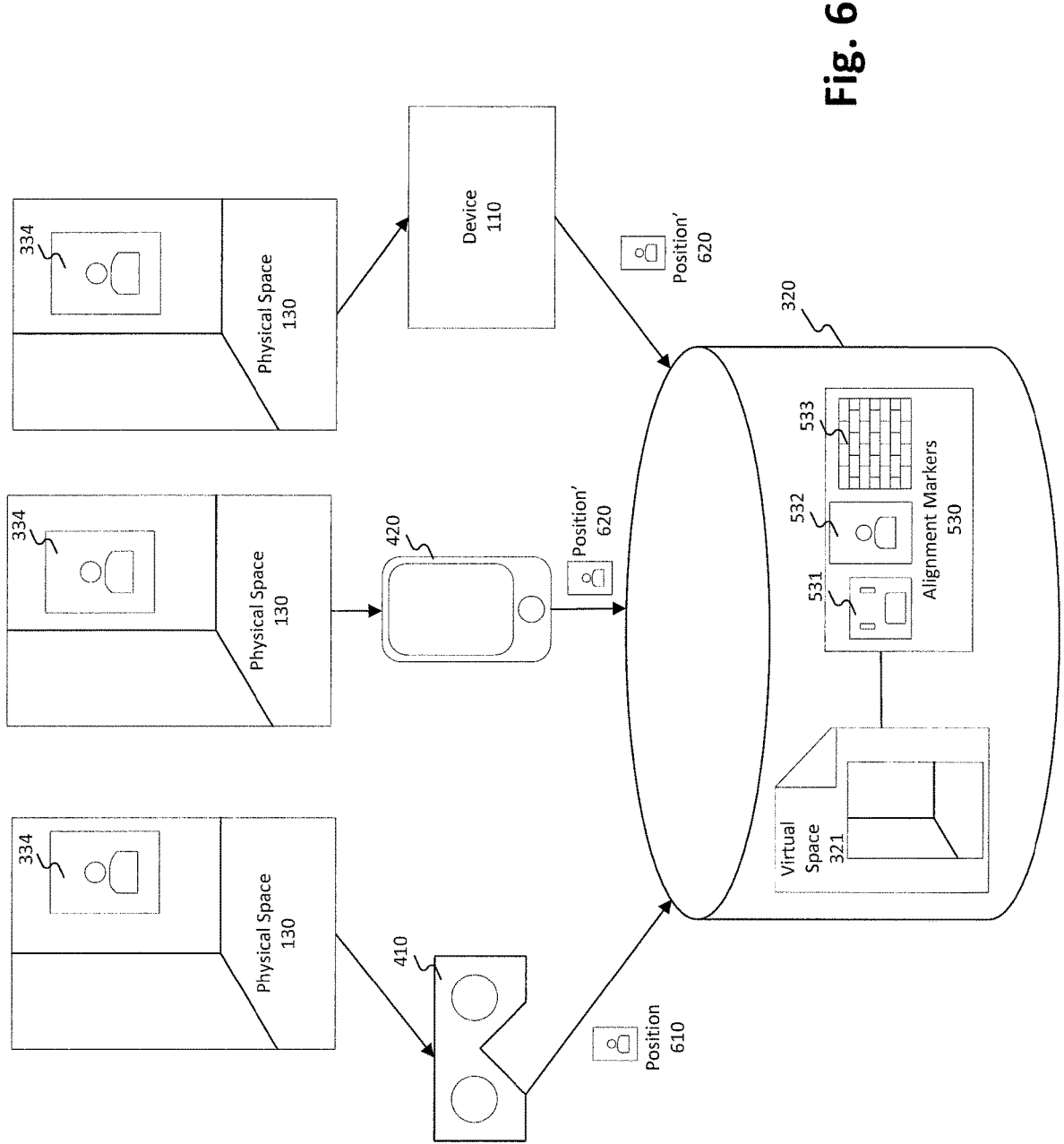
FIG. 6 illustrates exemplary image marker details accessed and updated by devices interacting with the same physical space, according to some embodiments of the present disclosure.

FIG. 6 illustrates exemplary image marker details accessed and updated by devices interacting with the same physical space, according to some embodiments of the present disclosure. As shown in FIG. 6, the devices 110, 410, and 420 interact with the same physical space 130 simultaneously and/or over a period of time. The device 410, as shown in FIG. 4, may access the physical space 130 by using the associated virtual space 321, and the devices 110 and 420 may be present in the physical space 130. The position information captured from the virtual space 321 during the initial setup discussed with reference to FIG. 5A forms the initial ground truth of the position of the image marker 334 in both physical space 130 and virtual space 321. The identified ground truth of the image marker 334 is stored as the alignment image marker 532. The devices 110, 410, and 420 may provide their own identified position 610 and position' 620 of the image marker 334 in the physical space 130. The identified information is used to update the alignment markers 530 storing position information of the image marker 334 in the aligned marker 532. In some embodiments, the devices 110, 410, and 420 may interact with the alignment system 140 requesting for the update of the position of the identified image marker 334. In some embodiments, the position is shared continuously, and the alignment system 140 makes the determination of whether to update the alignment image marker 532.

The alignment system 140 may generate an analytics map of aligned areas to inform future alignment and whether to provide spatial information updates about the aligned markers within the physical space 130. In order to generate the analytics map, the alignment system 140 may track users of devices (e.g., devices 110, 410, and 420) as they walk through the physical space 130 to determine where alignment is stable and accessible. Alignment stability is identified by determining if the device (e.g., the device 110) in the physical space 130 found alignment markers in the position (vertical plane and horizontal plane) identified in the virtual space 321 associated with the physical space 130. The alignment system 140 keeps track of times where there was a failure in identifying the alignment marker. Further, the tracking may involve clash detection by integrating occluded surface detection as the device (e.g., device 110) scans the surroundings of the physical space 130 using sensors (e.g., sensors 311). The alignment system 140 keeps track of all the locations where the alignment drops due to missing/non-existing alignment points or are inaccessible due to an occluded surface to generate a map of problem areas where more alignment points should be created. The alignment system 140 may supply this problem area map to devices 110, 410, and 420 along with the alignment markers 530 and aligned data layers 430 to find new alignment markers or new positions for existing alignment markers.

Figure 7A:
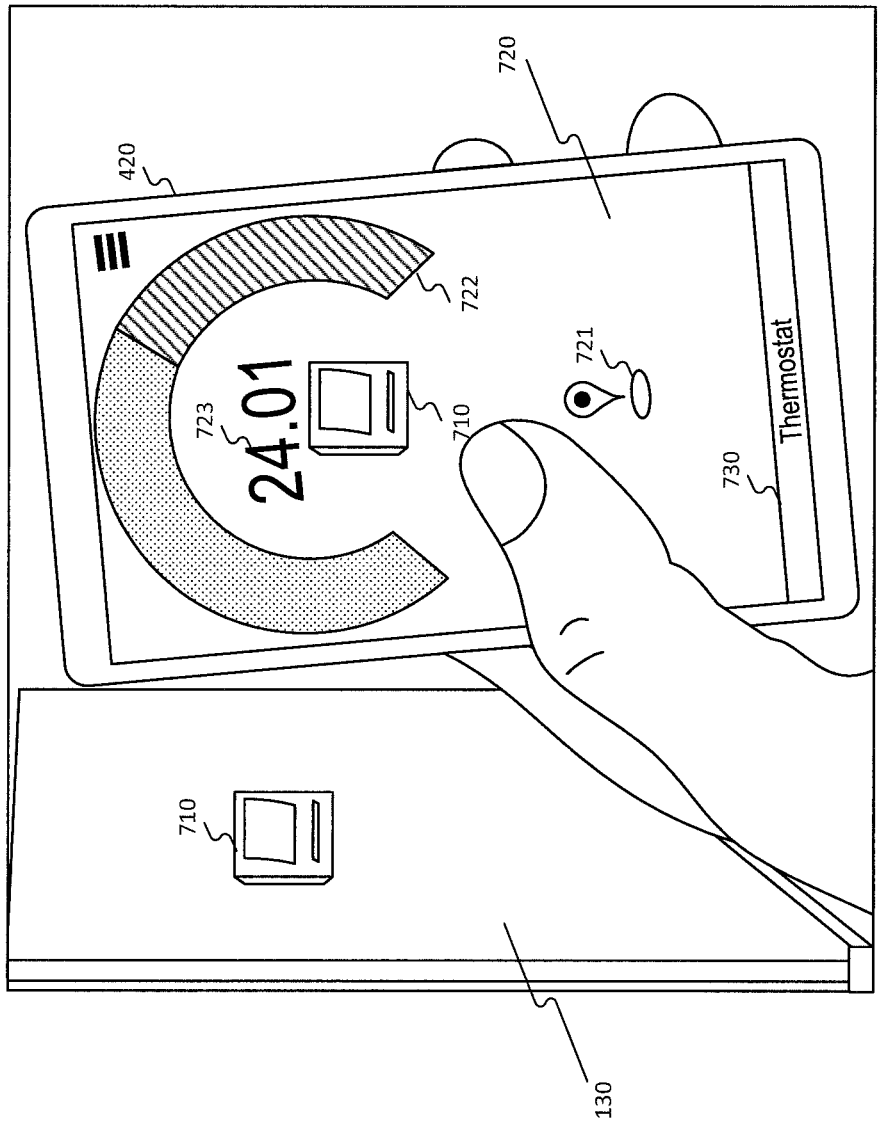
FIGS. 7A-7B represent exemplary embodiments showing interaction through a device to retrieve and update information in physical space, according to some embodiments of the present disclosure.
Figure 7B:
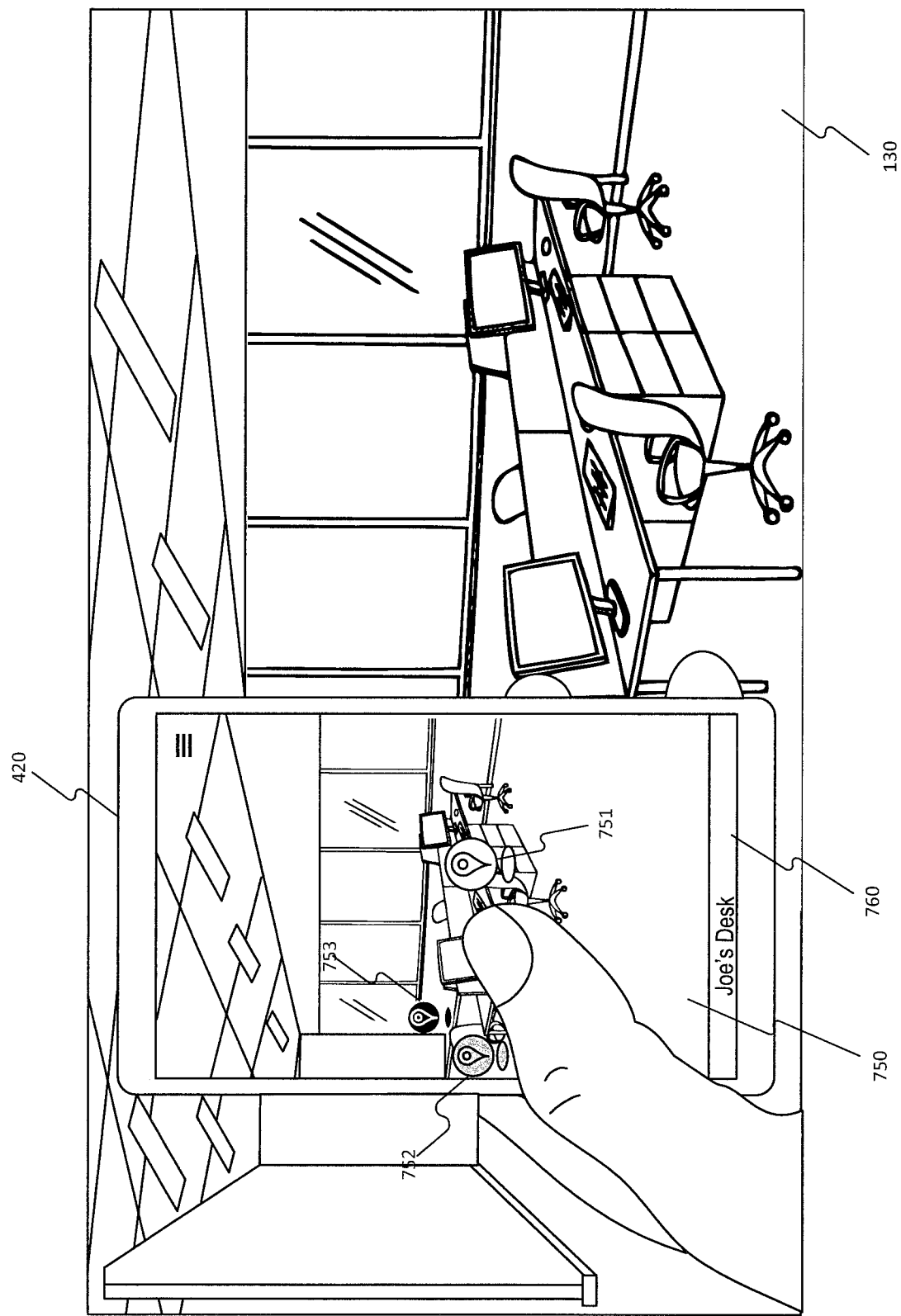

FIGS. 7A-7B represent exemplary embodiments showing interaction through a device to retrieve and update information in a physical space, according to some embodiments of the present disclosure. In addition to updating the spatial information, a device (e.g., device 420) in the physical space 130, as discussed in FIGS. 5A, 5B, and 6, may be used to both operate other devices and update their information. In some embodiments, the device (e.g., device 420) may be used to author information. For example, the authored information may be tags added to certain locations in the physical space.

As shown in FIG. 7A, device 420 may be used to operate a thermostat 710 in the physical space 130. An aligned data layer 720 is shown around the thermostat 710 and includes multiple informative components 721-723. The aligned data layer 720 may also include other mixed reality data shown as a section within the device 420 instead of overlaying on top of the physical space 130. For example, a banner 730 may be shown with additional details not overlaid on the physical space 130. The informative components 721-723 may include both operational functions and/or informative. For example, component 721 may act as an activation switch, which on interaction activates the other components 722 and 723 to update the thermostat 710 temperature settings. In some embodiments, interaction components may also act as alignment markers.

FIG. 7B shows multiple alignment markers within an aligned layer 750. The aligned layer 750 includes multiple interactive components 751-753, e.g., alignment markers which similarly may act as both as alignment markers as well as activation switches for showing additional information. In some embodiments, the presentation of additional information in an alignment layer may only occur on the selection of the interaction component. For example, the alignment marker 752 is selected in device 420 to show an informational banner at the bottom of the display of device 420.

The alignment layers generated or updated using interaction components may be accessible to only the user or group of users as defined when authoring the information. The access details of the information may also be determined based on location in the physical space and the type of information being accessed. The rules for accessing alignment layers and the information in the layers may be defined separately and included as part of the alignment system 140.

Figure 8A:
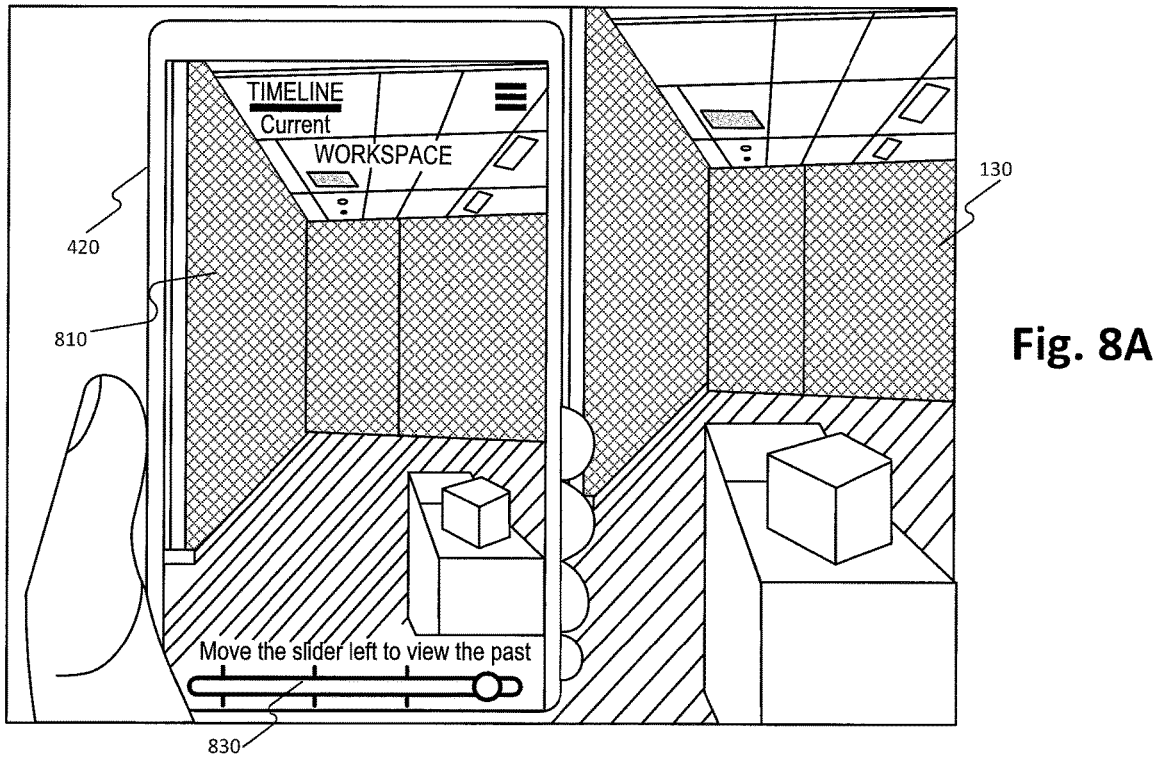
FIGS. 8A-8B illustrates exemplary device access to virtual space data as an alignment layer, according to some embodiments of the current disclosure.
Figure 8B:
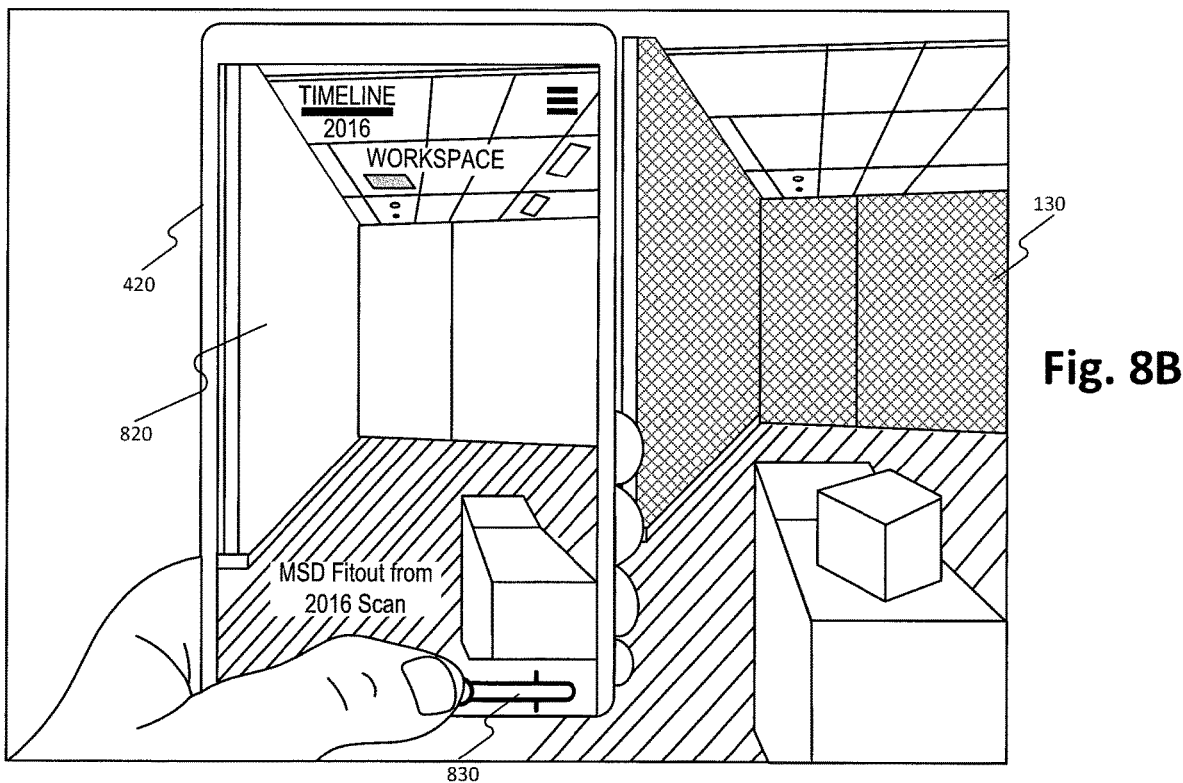

FIGS. 8A-8B illustrate exemplary device access to virtual space data as an alignment layer, according to some embodiments of the current disclosure. FIG. 8A shows a display on the device 420 of the current information about the physical space 130 and FIG. 8B shows the same physical space 130 information from the earlier year 2016.

The device 420 in FIG. 8A includes an alignment layer 810, showing the current information about the physical space 130. The alignment layer 810 may not include any additional data from the ACDS 260. Alternatively, the device 420 in FIG. 8B includes an alignment layer 820 overlaid on top of the physical space 130. The overlaid alignment layer 820 may be virtual space (e.g., the virtual space 321) scanned in the past and may not include all the new details present in the physical space at the current time. For example, the alignment layer 820 is missing the pattern on the wall and the stacked additional box in the bottom right corner. The device 420 is able to switch between alignment layer 810, which is augmented on the physical space 130, and the virtual space 820 with in the same device. The device 420 switches between physical and virtual spaces by aligning the relevant additional data layers from the ACDS 260. The alignment system 140 may provide additional alignment layers common between the different scenarios. The additional layers may be static and not connected to the physical space. For example, a timeline slider 830 at the bottom overlays on top of all the additional aligned data layers and can be used by a user to switch between current and past times.

Figure 9B:
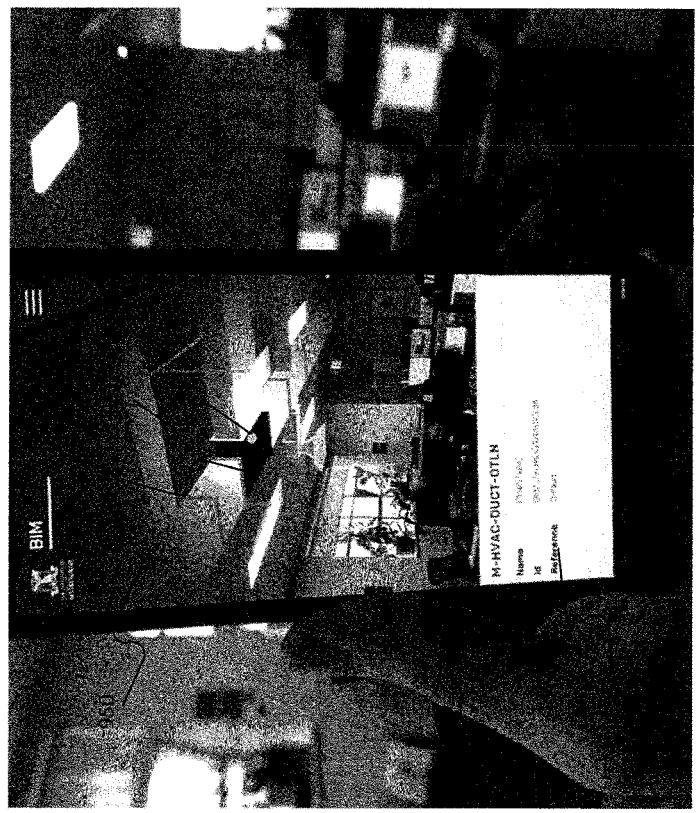
FIGS. 9A-9B illustrate exemplary device access to an additional alignment data set, according to some embodiments of the present disclosure.
Figure 9A:

FIGS. 9A-9B illustrate exemplary device access to additional alignment data sets accessed selectively and in whole, according to some embodiments of the present disclosure. As shown in FIG. 9A, a building information model data layer 910 is applied to the physical space 130 and is seen through the display of device 420. Alternatively, FIG. 9B shows a physical space 130 overlaid with aligned building information model data layer 950 only in areas selected using a selection component 951 represented by a circular dot. For example, the selection component 951 selects an HVAC duct section 952 in the physical space 130, resulting in the display of a bottom banner 960 with additional information about the selected portion of the physical space. The interaction component 721 (in FIG. 7A) has a static position and appears in close proximity to the portion of the physical space (thermostat) on which it intendeds to activate interaction. In contrast, the selection component 951 is a dynamic interaction component used for selecting different portions of the physical space 130 by moving the device 420.

Figure 10:
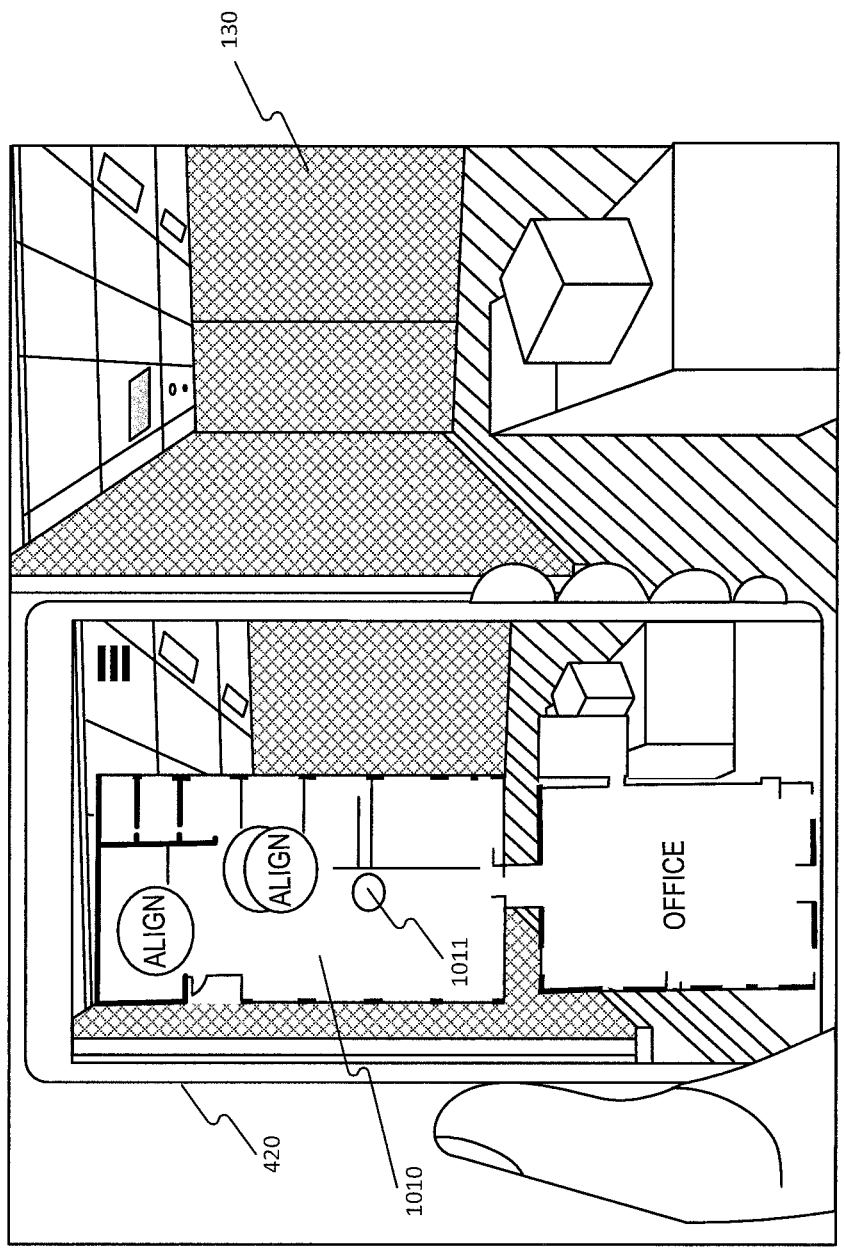
FIG. 10 depicts an exemplary device showing a summary view of multiple aligned markers, according to some embodiments of the current disclosure.

FIG. 10 depicts an exemplary device showing a summary view of multiple aligned markers, according to some embodiments of the current disclosure. As shown in FIG. 10, the device 420 displays the entire location map overlaid on top of a camera feed. The overlaid information is not aligned to any of the surroundings of the physical space 130. But the device alignment is used in the background in identifying the location of the device in the physical space 130. The device 420 interacts with the alignment system 140 and uses identified markers to understand the location, but instead of presenting the aligned data layers of the ACDS 260 overlaid on the physical space shows the position of the device 420 in physical space 130 shown as a map 1010. In such a scenario, the scale of the alignment data needs to be updated in order to present the accurate position of the device 420 in relation to the map 1010. The DCDS 340 may be used to determine the scale and change in the device 420 position and update the map 1010 with the position of the device 420 shown using an overlaid icon 1011.

Figure 11:
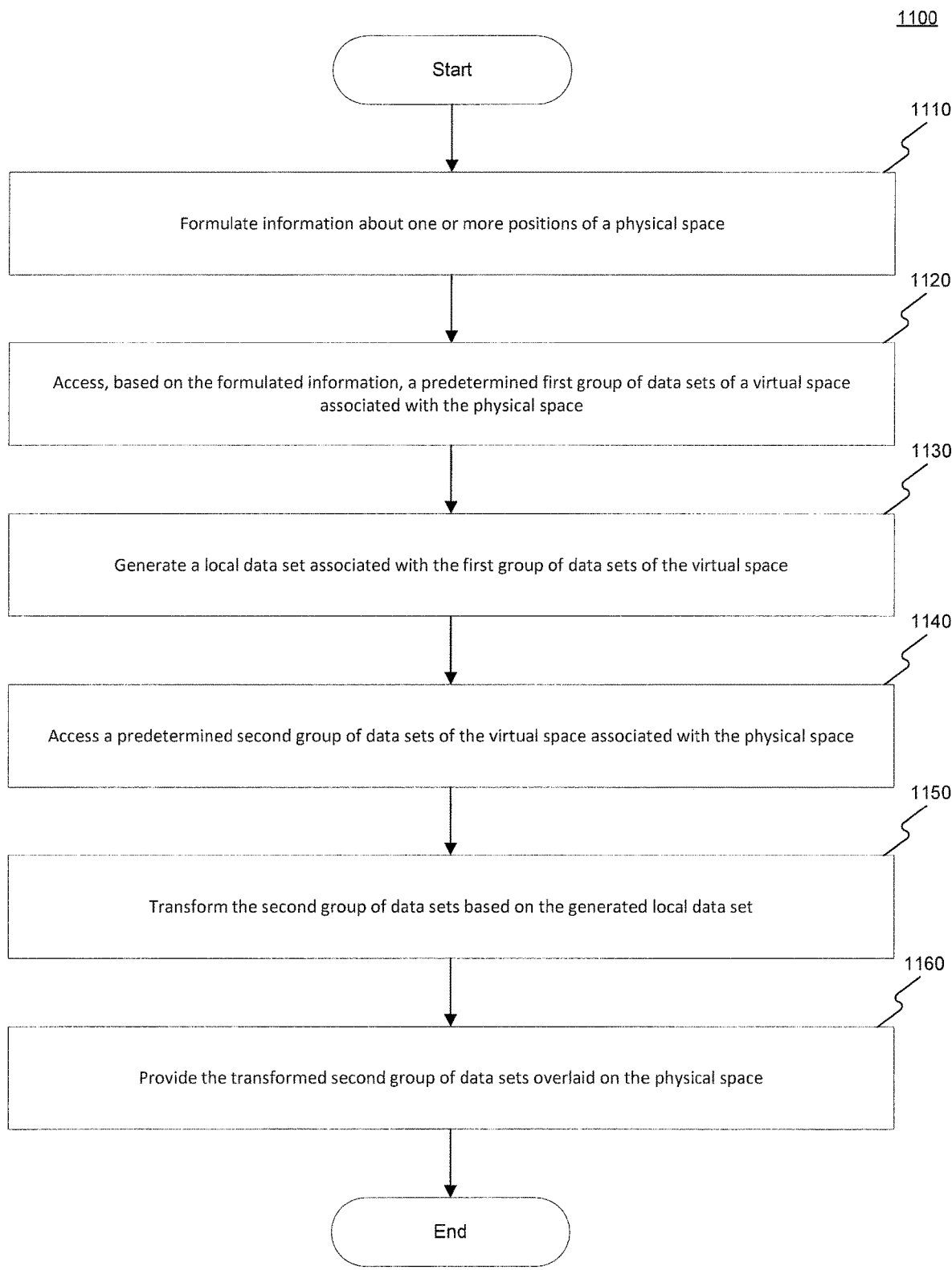
FIG. 11 is a flowchart illustrating an exemplary customized presentation of information in a physical space method, performed by the device depicted in FIG. 3, according to an exemplary embodiment.

FIG. 11 is a flowchart illustrating an exemplary method 1100 for customized presentation of information in a physical space, performed by the device 110 depicted in FIG. 3, according to an exemplary embodiment. The steps of method 1100 may be performed by the device 110, for purposes of illustration. It will be appreciated that the illustrated method can be altered to modify the order of steps, and to further include additional steps.

In step 1110, the device 110 formulates information about one or more portions of a physical space by using sensors (e.g., sensors 311) to interact with the physical space and retrieve the information describing a current state of the physical space (e.g., physical space 130) in which device 110 is currently located. The formulated information about one or more portions of the physical space may be used to identify the entire physical space 130 and/or help identify points of interest within one or more portions of the physical space. For example, the formulated information may include identification markers In step 1120, the device 110 accesses a predetermined first group of data sets of a virtual space (e.g., the virtual space 321) associated with the physical space 130. The first group of data sets may include alignment markers (e.g., the alignment markers 530) previously identified and including within the MVCDS 240. The alignment markers may be predetermined by the alignment system 140 based on the device capabilities, including the availability of certain types of sensors 311 to capture information relevant to the alignment markers 530. Predetermination factors may also include the availability of identification markers (e.g., the identification markers 330) in the physical space 130. The device 110 prior to accessing the predetermined first group of data sets may need to use the information in the previous step to identify the virtual space (e.g., the virtual space 321). The virtual space 321 may be associated with a predetermined first group of data sets and are returned on the identification of the virtual space 321.

In step 1130, device 110 may use the alignment markers 530 in the MVCDS 240 to generate a local data set (e.g., the DCDS 340) and store it in a local database (e.g., the local database 313). The generated local data sets may include spatial information about the alignment markers with respect to the device 110. The spatial information may include a scaling factor for the horizontal and vertical distance and/or orientation of the alignment markers in relation to the surroundings of the physical space 130 and/or the device 110. The local data set helps accurately identify the position of a point of interest and later helps in proper alignment of additional data overlaid on the physical space.

In step 1140, the device 110 accesses a predetermined second group of data sets of the virtual space 321 associated with the physical space 130. The second group of data sets may include one or more aligned data layers 430. The predetermined set may include the default set of layers presented for the physical space or a list of all available additional data layers aligned previously to the virtual space 321 and stored in the database 320 as the ACDS 260. For example, the devices 410 and 420 display the default aligned data layer 433 upon identification and/or selection of the physical space 130 for interaction with the device 110.

In step 1150, device 110 utilizes the DCDS 340 to transform the second group of data sets to present on the device 110 display. The transformed second group of data sets may include a selected subset of aligned data layers in the ACDS 260. For example, the device 410 (in FIG. 5) selects the aligned data layer 523 to be presented in the physical space 130 resulting in the position and orientation details of the aligned layer 523 updated based on the DCDS 340 in the local database 313 before sending to the display (e.g., display 312).

In step 1160, the device 110 provides the transformed second group of data sets to present on the display 312. The device 110 sends the aligned data layers to the display and keeps track of their usage. In some embodiments, the device 110 continuously shares the aligned layer usage information through data communication system 230 for analysis by the alignment system 140.

Figure 12:
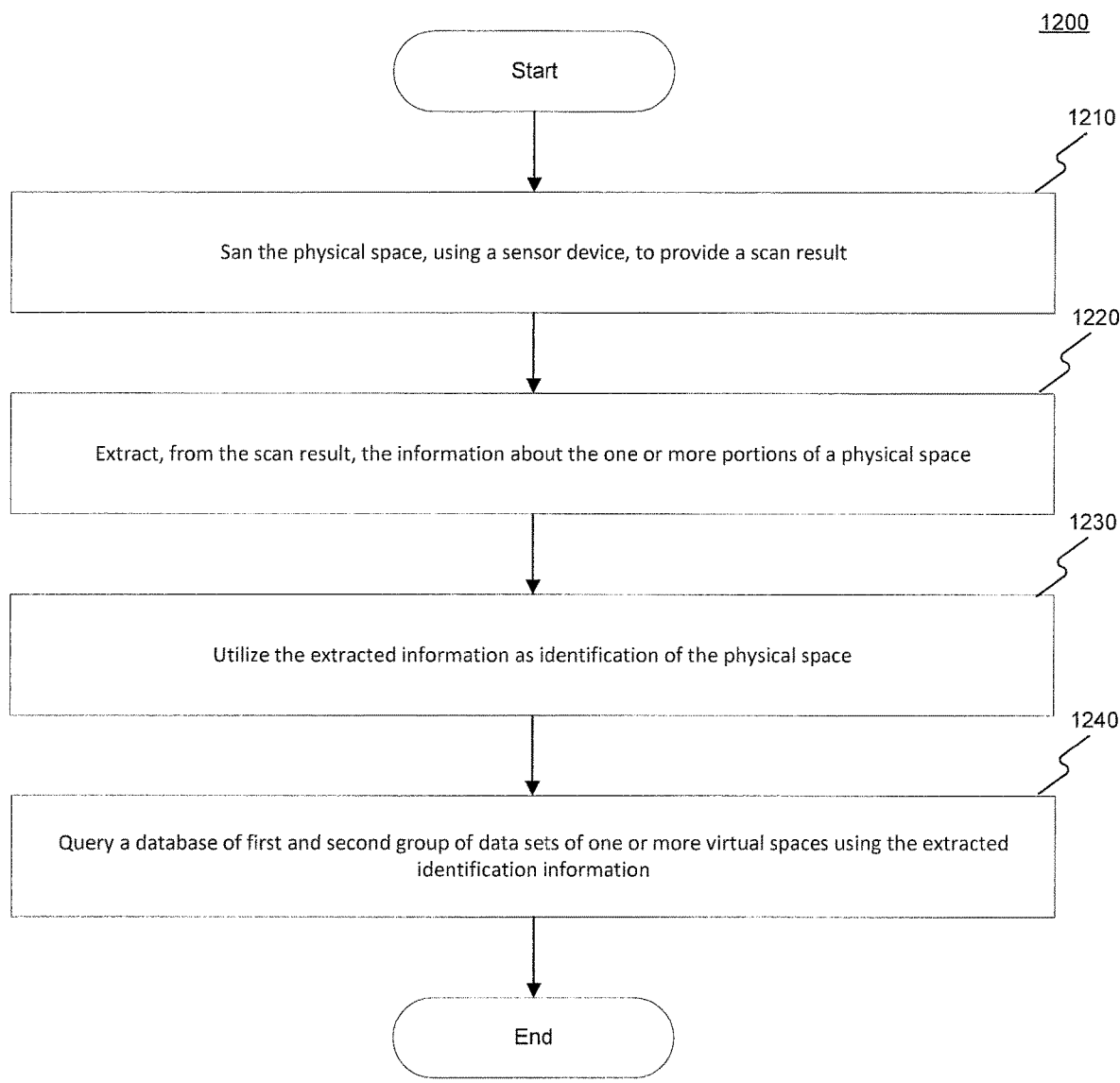
FIG. 12 is a flowchart illustrating an exemplary method for the identification of physical space, according to some embodiments of the current disclosure.

FIG. 12 is a flowchart illustrating an exemplary method 1200 for the identification of physical space, according to some embodiments of the current disclosure. The steps of method 1200 may be performed by the device 110 for purposes of illustration. It will be appreciated that the illustrated method can be altered to modify the order of steps, and further include additional steps.

In step 1210, device 110 scans the physical space 130 using one or more sensors 311 to provide a scan result to the device 110. The scanned result may consist of images taken using a camera sensor. The scanned result may also include details from a gyroscope sensor providing details of the orientation of the device 110 requesting the scanning of the physical space 130. The combined details of information from multiple sensors are used in understanding the surroundings of the physical space 130. For example, the camera sensor may help identify the presence of an object in the physical space 130, and the gyroscope sensor may help identify the position of the object based on the orientation information of the device 110. Additional location sensors in the form of GPS and beacons may also be used in identifying the position details of the object identified by the camera sensor and included as part of the scanned result.

In step 1220, the device 110 extracts information in the form of the identification markers 330 about the one or more portions of the physical space 130 from the scan result. The extraction process may involve analyzing the information captured by the sensors (e.g., sensors 311) and fusing them together (as described in the previous step 1210) to identify markers (e.g., captured markers 335) within a portion of the physical space 130. The captured markers 335 may be used to identify the physical space 130 and the particular location within the physical space 130. The device 110 may also continuously and automatically analyze the output from the sensors 311 in association with other digital information in the form of previously identified markers of the same location within the physical space 130. The continuous analysis may help the device 110 make a prioritized list of markers to be used as alignment points (e.g., the alignment markers 430) for interacting with the physical space 130 using the additional calibrated data sets 260 stored in the database 320 and associated with the physical space 130.

In step 1230, the device 110 utilizes the extracted information as identification information for querying about the physical space 130. The identification information is obtained by mapping the identification markers 330 to a site ID in the site ID database 220. In some embodiments, the site ID determination may be delegated to the data management system 210.

In step 1240, the device 110 queries the database 320 using a site ID obtained in the previous step 1230 to obtain the mixed reality data 120 associated with the physical space 130. The mixed reality data 120 may include the first group of data sets identifying the physical space 130 in digital format. The first group of data sets may include the virtual space 321, the three-dimensional scan of the physical space 130, and the MVCDS 240. The second group of data sets may include the additional data layers to be overlaid on the physical space upon the selection of these data layers.

Figure 13:
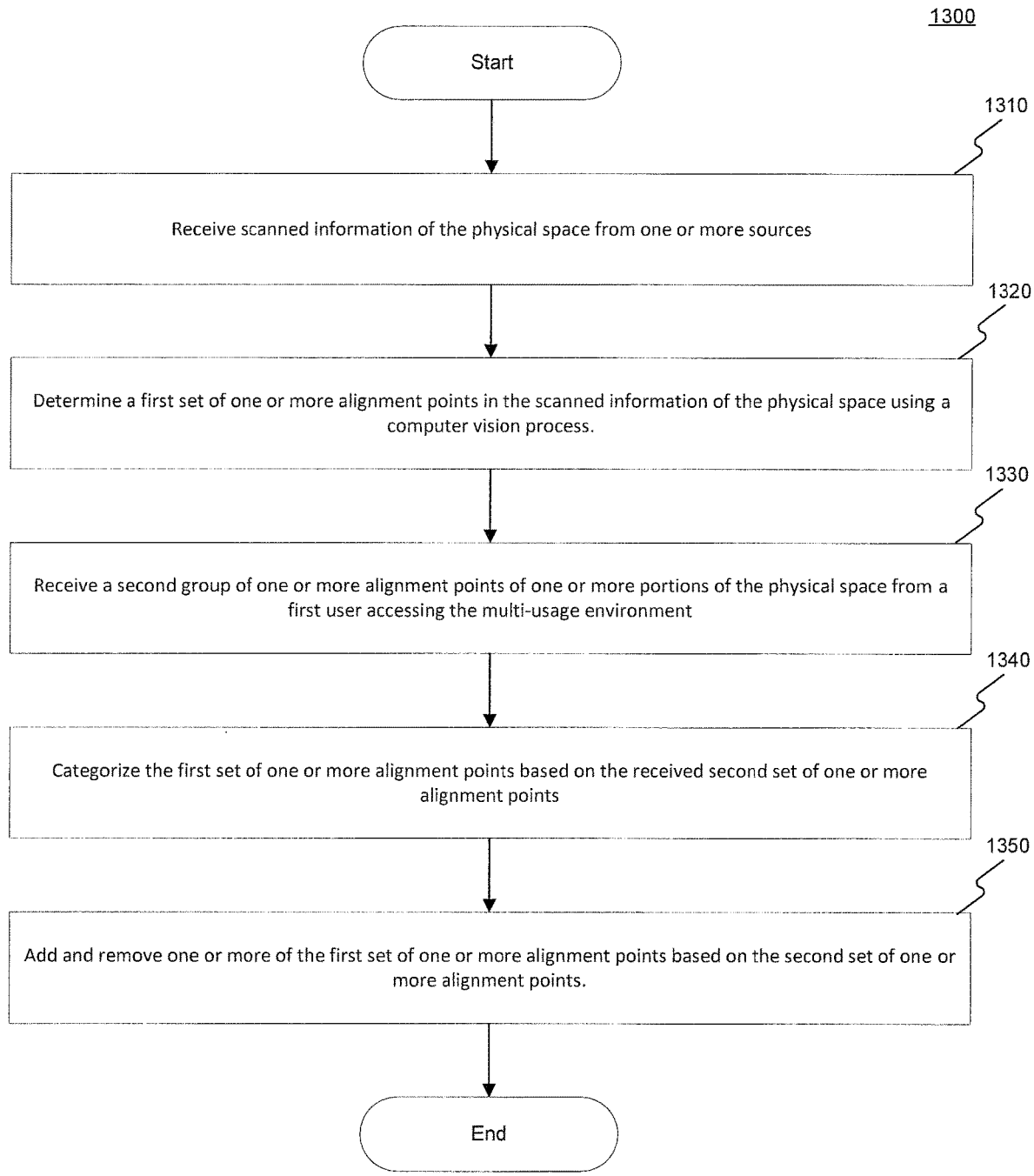
FIG. 13 is a flowchart illustrating an exemplary method for maintenance of a multi-usage virtual environment of physical space, according to some embodiments of the current disclosure.

FIG. 13 is a flowchart illustrating an exemplary method 1300 for maintenance of a multi-usage virtual environment of physical space, according to some embodiments of the current disclosure. The steps of method 1300 may be performed by the alignment system 140, for purposes of illustration. It will be appreciated that the illustrated method can be altered to modify the order of steps, and further include additional steps.

In step 1310, alignment system 140 receives a three-dimensional scan of the physical space scanned using a 3D scanning device (e.g., Matterport™). The scanned information is stored in the database 320 as the virtual space 321. In some embodiments, the scanned information of the physical space may be provided by the devices 110, 410, 420. The scanned information from the devices 110, 410, and 420 may be used to update the existing virtual space 321. Updates to the virtual space 321 may include stitching together the information captured by the devices 110, 410, and 420 into a three-dimensional space. In some embodiments, the alignment system 140 delegates the responsibility of managing the virtual space 321 in the database 320 to the data management system 210. The data management system 210 creates a site ID for the virtual space 321 in the site ID database 220.

In step 1320, the alignment system 140 determines the first set of one or more alignment points in the scanned information of the physical space using a computer vision process. The alignment system 140 uses machine learning techniques to identify various objects within the physical space, including popular portraits, known structures such as door, doorknobs, power outlets, windows, etc., The alignment system 140 may use popular machine learning models to identify the objects in the room. The computer vision process may also help identify the planes of the physical space to determine the position of the ceiling and floor and the dimensions of the room. The dimensions of the room are important in the alignment of digital information on the surroundings in the physical space 130.

In step 1330, the alignment system 140 may receive a second group of one or more alignment points of one or more portions of the physical space from a first user accessing the multi-usage environment.

In step 1340, the alignment system 140 categorizes the first set of one or more alignment points based on the received second set of one or more alignment points. In some embodiments, The categorization of the alignment points may be based on the successful usage of the alignment points by devices in the physical space (e.g., the physical space 130) accessing the alignment points to align the devices and interact with aligned data layers (e.g., the aligned data layers 430) associated with the physical space 130. In some embodiments, categorization could also be based on the aggregated accuracy determined by the accuracy of the spatial information about an alignment point in MVCDS 240, and the extent of updates a device (e.g., device 110) may need to make to adjust it to be used. Categorization may further be based on the last successful alignment and/or an alignment point lifespan.

In step 1350, the alignment system 140 may add or remove one or more of the first set of one or more alignment points based on the second set of one or more alignment points. In some embodiments, when new alignment points are detected, the data management system 210 compares their relative location to the previous alignment points locations to find outliers or incorrect alignment of the previous alignment points. In some embodiments, the alignment system 140 can anticipate and estimate where an alignment point (e.g., the alignment markers 530) should have been based on depth perception from the scanned portion of the physical space. The depth perception may come from the ability to fuse information from multiple sensors 311.

An update to the alignment points may be based on the information authored by a user of a device (e.g., the device 110). If additional information (as described in FIGS. 7A-7B) is present, then the alignment system 140 understands that the portion of the physical space (e.g., the physical space 130) may be more important for the user and may attempt to identify more alignment points (e.g., the alignment markers 530) in that portion of the physical space. The addition of alignment points may be increased in highly popular areas of the virtual space 321.

Various operations or functions are described herein, which may be implemented or defined as software code or instructions. Such content may he directly executable ("object" or "executable" form), source code, or difference code ("delta" or "patch" code). Software implementations of the embodiments described herein may be provided via an article of manufacture with the code or instructions stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, and the like), such as recordable/non-recordable media (e.g., read-only memory (ROM), random access memory (RAM), magnetic disk storage media, optical storage media, flash memory devices, and the like). A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present disclosure may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A non-transitory computer readable medium including instructions that, when executed by at least one processor, cause the at least one processor to perform operations for customized presentation of digital information reflecting a physical space, where the customized presentation is displayed via a display, the operations comprising:
   formulating state information about one or more portions of the physical space;
   accessing, based on the formulated state information, a predetermined first group of data sets of alignment information of a virtual space associated with the physical space, where the alignment information reflects alignments of structure within the physical space;
   generating a local data set of spatial information using the first group of data sets of alignment information of the virtual space, where the spatial information reflects a spatial orientation of the physical space;
   accessing a predetermined second group of data sets of one or more aligned data layers of the virtual space associated with the physical space, where an aligned data layer of the one or more aligned data layers reflects an association of digital information with the spatial information;
   receiving a set of one or more alignment points from a user device;
   transforming the second group of data sets of one or more aligned data layers by aligning the received set of one or more alignment points with the generated local data set to align the digital information with the spatial information;
   providing the transformed second group of data sets of one or more aligned data layers overlaid, via the display, on the physical space; and
   generating, based on the received set of one or more alignment points and the local data set, a map of areas within the physical space where one or more additional alignment points are needed.

2. The non-transitory computer readable medium of claim 1, wherein the formulating the information about one or more portions of a physical space further comprises:
   scanning the physical space, using a sensor device, to provide a scanning result;
   extracting, from the scanning result, the information about the one or more portions of the physical space; and
   utilizing the extracted information as identification of the physical space.

3. The non-transitory computer readable medium of claim 2 further comprises:
   querying a database of the first and the second group of data sets of one or more virtual spaces using the extracted information.

4. The non-transitory computer readable medium of claim 1, wherein the accessing of the predetermined first group of data sets of alignment information is based on location information of the physical space.

5. The non-transitory computer readable medium of claim 4, wherein the location information includes at least one of GPS coordinates, point of interest markers, and patterns of surfaces in the physical space.

6. The non-transitory computer readable medium of claim 1, wherein generating a local data set of spatial information using the first group of data sets of the virtual space further comprises:
   identifying positioning information of the first group of data sets of alignment information of the virtual space in the physical space.

7. The non-transitory computer readable medium of claim 1, wherein the first group of data sets of alignment information of the virtual space includes the one or more portions of the physical space.

8. The non-transitory computer readable medium of claim 1, wherein the providing the transformed second group of data sets of one or more aligned data layers overlaid, via the display, on the physical space further comprises:
   aligning each set of the second group of data sets of one or more aligned data layers to the one or more portions of the physical space; and
   superimposing the second group of data sets of one or more aligned data layers on to the one or more portions of the physical space.

9. The non-transitory computer readable medium of claim 8 further comprises:
   generating a third group of data sets of position and orientation of a layer by aligning the second group of data sets of one more aligned data layers to the virtual space; and
   including the third group of data sets in a database of the first group and second group of data sets of one or more virtual spaces.

10. The non-transitory computer readable medium of claim 9, wherein the including the third group of data sets further comprises:
    updating the first group of data sets of the virtual space by both adding data sets to the first group of data sets and revising one or more data sets of the first group of data sets.

11. The non-transitory computer readable medium of claim 1, wherein the virtual space comprises previously scanned one or more portions of the physical space.

12. The non-transitory computer readable medium of claim 1, wherein the displayed one or more aligned data layers include a path for navigating the physical space.

13. The non-transitory computer readable medium of claim 12, wherein the one or more aligned data layers including the path for navigating the physical space is temporarily generated and continuously updated.

14. The non-transitory computer readable medium of claim 1, wherein generating the map of areas comprises:
    tracking an alignment stability between the local data set and the set of one or more alignment points; and
    wherein the operations further comprise:
    providing the map of areas overlaid, via the display, on the physical space.

15. A computer-implemented method for customized presentation of digital information reflecting a physical space, where the customized presentation is displayed via a display, the method comprising:
    formulating state information about one or more portions of the physical space;

accessing, based on the formulated state information, a predetermined first group of data sets of alignment information of a virtual space associated with the physical space, where the alignment information reflects alignments of structure within the physical space;

generating a local data set of spatial information using the first group of data sets of the virtual space, where the spatial information reflects a spatial orientation of the physical space;

accessing a predetermined second group of data sets of one or more aligned data layers of the virtual space associated with the physical space, where an aligned data layer reflects an association of the alignment information with the spatial information;

receiving a set of one or more alignment points from a user device;

transforming the second group of data sets of one or more aligned data layers by aligning the received set of one or more alignment points with the generated local data set to align the digital information with the spatial information;

providing the transformed second group of data sets overlaid, via display, on the physical space; and generating, based on the received set of one or more alignment points and the local data set, a map of areas within the physical space where one or more additional alignment points are needed.

16. The computer-implemented method of claim 15, wherein the formulating the state information about one or more portions of the physical space further comprises:

scanning the physical space, using a sensor device, to provide a scanning result;

extracting, from the scanning result, the information about the one or more portions of the physical space; and utilizing the extracted information as identification of state of the physical space.

17. The computer-implemented method of claim 16 further comprises:

querying a database of the first group and the second group of data sets of one or more virtual spaces using the extracted information.

18. The computer-implemented method of claim 15, wherein the providing the transformed second group of data sets of one or more aligned layers overlaid on the physical space further comprises:

aligning each set of the second group of data sets of one or more aligned data layers to the one or more portions of the physical space; and superimposing the second group of data sets of one or more aligned data layers on to the one or more portions of the physical space.

19. The computer-implemented method of claim 18, further comprises:

generating a third group of data sets of position and orientation of a layer by aligning the second group of data sets of one more aligned data layers to the virtual space; and including the third group of data sets to a database of the first group and the second group of data sets of one or more virtual spaces.

20. The computer-implemented method of claim 19, wherein the including the third group of data sets further comprises:

updating the first group of data sets of the virtual space by both adding data sets and revising one or more data sets of the first group of data sets.

\* \* \* \* \*